Dec. 19, 1967 M. RUDERFER 3,358,389
DISPLAY APPARATUS FOR VISUAL PRESENTATION
OF QUANTITATIVE DATA
Filed Jan. 8, 1965 5 Sheets-Sheet 1

INVENTOR.
MARTIN RUDERFER
BY
Pennie, Edmonds, Morton, Taylor & Adams
ATTORNEYS

INVENTOR.
MARTIN RUDERFER
BY
Pennie, Edmonds, Morton, Taylor & Adams
ATTORNEYS

INVENTOR.
MARTIN RUDERFER
BY
Pennie, Edmonds, Morton, Taylor & Adams
ATTORNEYS

INVENTOR.
MARTIN RUDERFER
BY
Pennie, Edmonds, Morton, Taylor & Adams
ATTORNEYS

Dec. 19, 1967 M. RUDERFER 3,358,389

DISPLAY APPARATUS FOR VISUAL PRESENTATION OF QUANTITATIVE DATA

Filed Jan. 8, 1965 5 Sheets-Sheet 5

INVENTOR.
MARTIN RUDERFER
BY
Pennie, Edmonds, Morton, Taylor & Adams
ATTORNEYS

United States Patent Office 3,358,389

Patented Dec. 19, 1967

3,358,389

DISPLAY APPARATUS FOR VISUAL PRESENTATION OF QUANTITATIVE DATA

Martin Ruderfer, % Dimensions, Inc., 95 Madison Ave., Hempstead, N.Y. 11550

Filed Jan. 8, 1965, Ser. No. 424,419
21 Claims. (Cl. 35—24)

This invention relates to display apparatus for visual presentation of quantitative data and, more particularly, to apparatus for producing a three-dimensional display of quantitative data. In accordance with the invention, information describable in terms of sets of three or more variable quantities is displayed in a volumetric region, with each of three of the variable quantities being plotted, for example, along a separate axis of a three-dimensional coordinate system within the region.

Heretofore, various types of two-dimensional display apparatus have been devised for displaying quantitative data describable in terms of two or more variable quantities. For example, either mechanical or electronic devices are available for producing two-dimensional curved line images representative of such data. Where data is described in terms of three variable quantities, the third variable has also been displayed on such two-dimensional devices, for example, by producing a family of two-dimensional curved line images, a single value of the third variable being associated with and indicated for each such two-dimensional image.

Actual three-dimensional displays of quantitative data have also been produced by physically constructing a substantially permanent three-dimensional model having a continuous surface, the location of any point on the surface being describable in terms of three space coordinates representative respectively of the three variable quantities displayed.

More recently, electronic display apparatus has been devised wherein a third dimension is simulated on a two-dimensional cathode ray tube by varying the brightness of the displayed image according to the magnitude of the third variable quantity, the remaining two variable quantities being represented by the two-dimensional coordinates of a point on the cathode ray tube screen. Other highly complex and relatively costly three-dimensional electronic display devices are also known and used at the present time.

In accordance with the present invention, three-dimensional display apparatus is provided wherein quantitative data is displayed in a volumetric region by locating headed pins at discrete points on a supporting base and by adjusting the height to which the pinheads project into the volumetric region above the surface of the supporting base. The location of the pins on the supporting base (describable in terms of two coordinates) and the projection thereof above the supporting base surface are representative of the magnitudes of the three variable quantities which describe the displayed data.

In accordance with the invention, relatively inexpensive, re-usable and readily operable apparatus is provided for producing a visual display of the type described above. The apparatus provides means for readily locating and adjusting the indicating devices or headed pins in accordance with the multi-variable data which is to be displayed.

The invention now will be described further in connection with the accompanying drawings in which.

Figure 1:
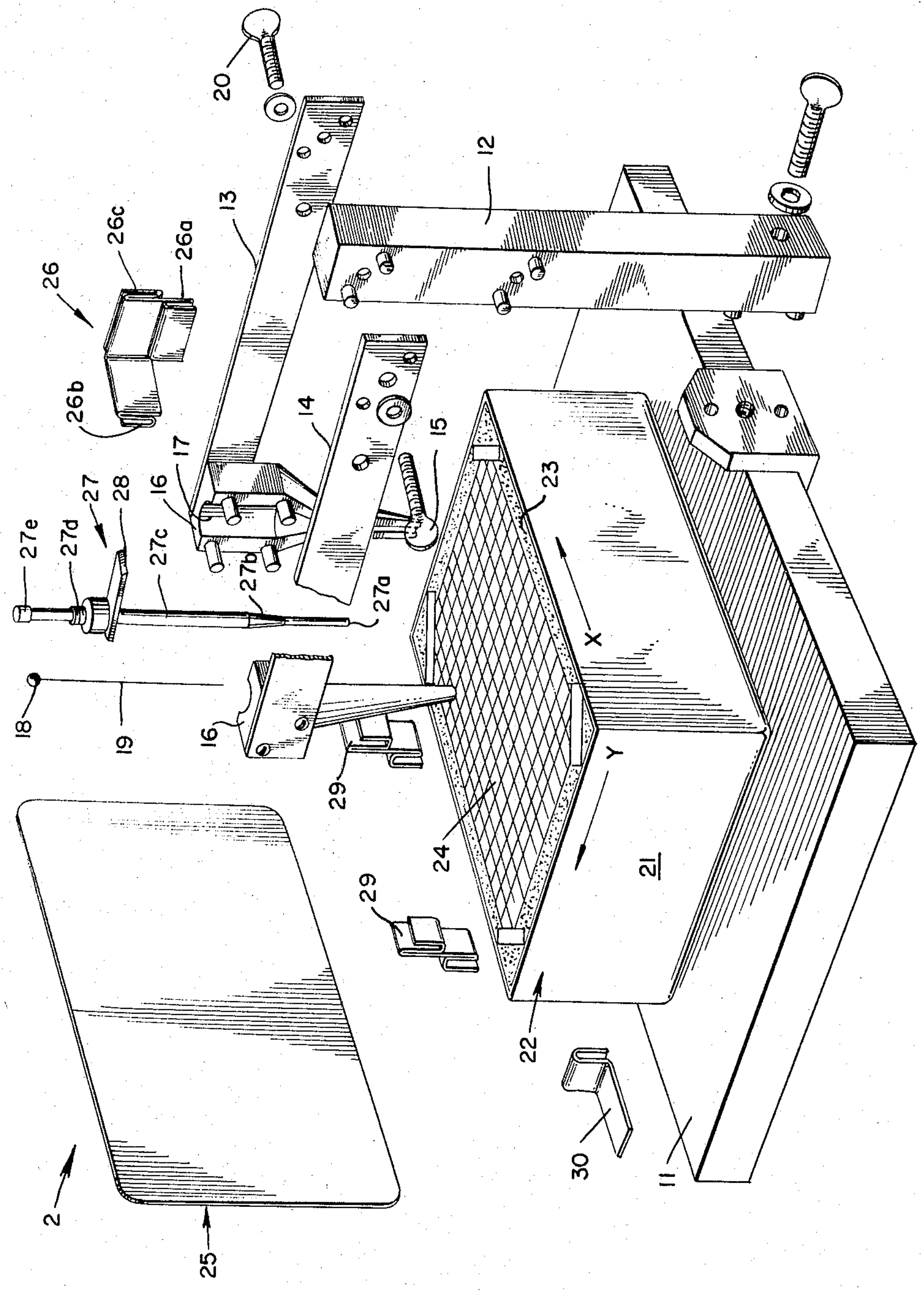
FIGURE 1 is an exploded view of apparatus by means of which, in accordance with a first embodiment of the invention, a three-dimensional display of quantitative data may be produced.
Figure 2:
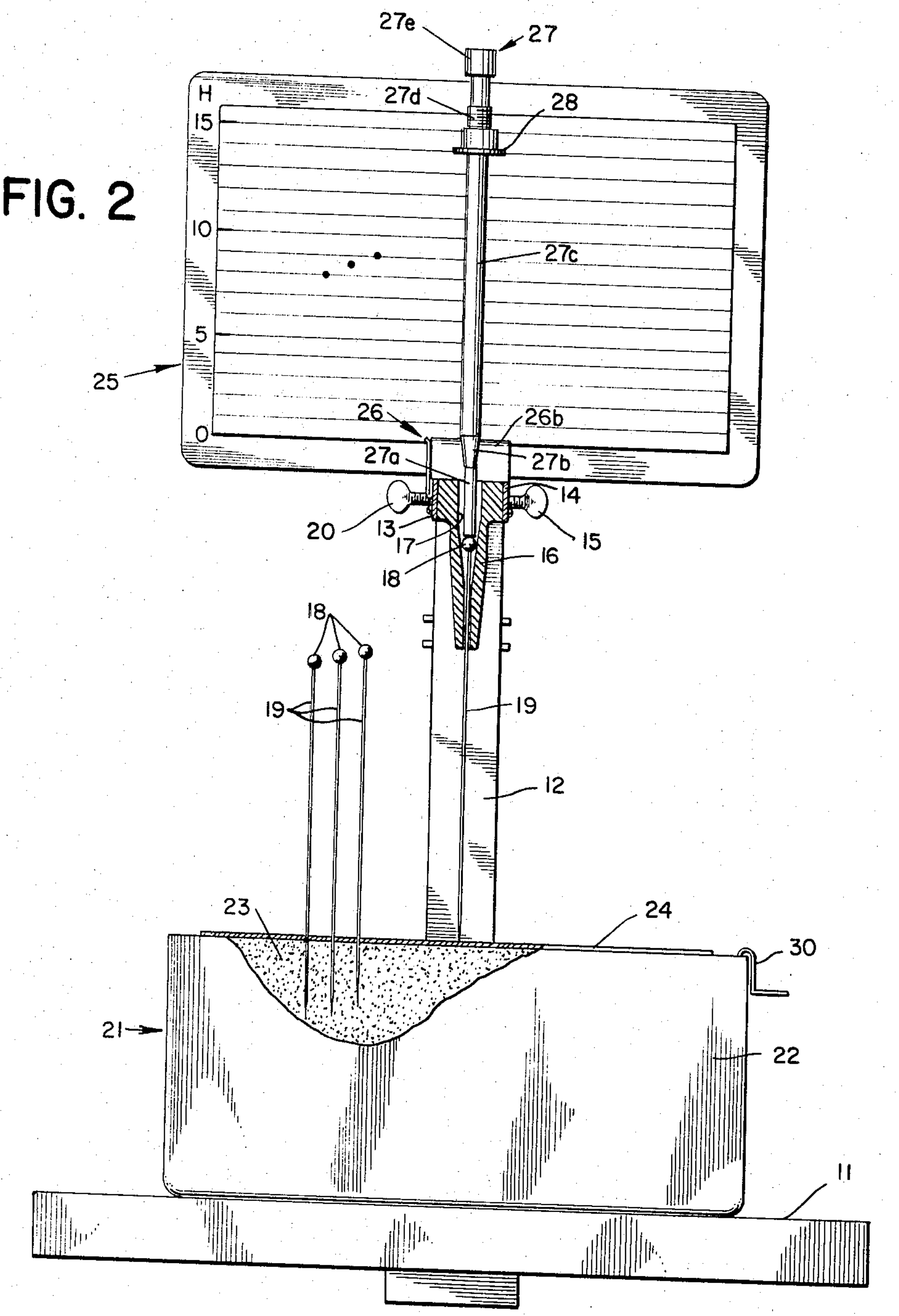
FIGURE 2 is a diagram, partially in section, of the apparatus of FIGURE 1 looking in the direction of the arrow "2" in FIGURE 1, the figure showing details of a first pin guiding and positioning device whereby the indicating pins are positioned along vertical lines.

Referring to FIGURE 1 of the drawing, display apparatus constructed in accordance with the present invention comprises a substantially horizontal, smooth-topped plotting table 11 to which there is fastened a vertical post 12. Two cantilevered beams 13 and 14 are fastened together, one on each side of post 12, by means of screw 15. Two halves of a pin guiding device 16 are fastened each to a separate one of beams 13 and 14 at the ends thereof remote from post 12. As is shown in FIGURE 2, a passage 17 is formed in pin guiding device 16, the upper portion of the passage being cylindrical and substantially larger than the head 18 of an indicating device or pin 19. Preferably, at least a portion of the passage 17 is of conical shape and the lowermost substantially cylindrical portion thereof is of lesser diameter than the head of pin 19. A thumb screw 20 passes through a hole in beam 13 and into a threaded hole in beam 14 to provide means for adjusting the force required to spread apart the two halves of pin guiding device 16 as will be pointed out below.

The display apparatus further comprises a display supporting base 21, base 21 comprising a substantially rigid metallic box 22, the upper part of which (say its uppermost two inches) is filled with a permeable material 23 such as polyethylene foam. Supporting base 21 may be positioned manually at any location on table 11. The exposed top surface of permeable material 23 is substantially flat. A two-dimensional horizontal coordinate reference means 24 such as a sheet of quadruled paper is fastened thereto by, for example, adhesive tape. The apparatus further comprises a vertical coordinate reference means or scale 25 formed, for example, of a sheet of rigid plastic material having substantially parallel, graduated lines ruled thereon as is shown in FIGURE 2. Vertical scale 25 may be supported above the surface of foam material 23 by means of a clip 26. Clip 26 comprises a downwardly opening channel portion 26a and at least one upwardly opening channel portion 26b. A second upwardly opening channel portion 26c may also be provided. Downwardly opening channel portion 26a is adapted to rest upon either of beams 13 or 14 while upwardly opening channels 26b and 26c are each arranged to receive and support vertical scale 25 (see FIGURE 2). Channel 26b is disposed substantially at a right angle with respect to channels 26a and 26c. A pin depressor 27 comprising a cylindrical tip portion 27a, an intermediate conical portion 27b, a cylindrical shank portion 27c, a threaded portion 27d and a head 27e is also provided. An adjustable knife edge marker 28 is screwed onto the threaded portion 27d and may be advanced along such threaded portion.

Referring to FIGURES 1 and 2, a three-dimensional display of quantitative data is produced in accordance with one aspect of the invention in the following manner. For illustrative purposes, it will be assumed that a display is to be produced of the variation in magnetic field strength measured along a particular plane in a magnetic field. Appropriate $x$, $y$ (distance) and H (magnetic field strength) reference scales are selected and indicated on the horizontal and vertical coordinate reference means 24 and 25 (see e.g. FIGURE 2) according to the measured range of values for each of the three variables.

A pin 19 is placed in pin guiding device 16 as shown in FIGURE 2 and supporting base 21 is manually positioned such that the point of pin 19 is immediately above a point outside the line portion of horizontal coordinate reference means 24. Vertical scale 25 is then placed in an upright position near the pin being plotted with the bottom edge thereof resting on the top edge of metal box 22. Pin depressor 27 is inserted into aperture 17 and a downward force is applied thereto to push pin 19 through pin guiding device 16 into permeable material 23. As the downward force is applied, the lower ends of the two halves of pin guiding device 16 spread apart and permit head 18 of pin 19 to pass out of aperture 17. The force required to spread the halves of guiding device 16 apart may be adjusted by means of thumb screw 20. Pin 19 is pushed downwardly into permeable foam material 23 until the head 18 thereof is aligned with the zero reference coordinate on vertical scale 25. The foam material frictionally engages pin 19 and retains such pin in place. Clip 26 is then placed over one of beams 13 or 14 and vertical scale 25 is inserted, for example, in channel portion 26*b* (see FIGURE 2). The lower end of pin depressor 27 then is placed on top of head 18 of the pin 19 previously inserted in horizontal coordinate reference 24. Knife edge marker 28 is moved either upwardly or downwardly until such marker is aligned with the $H=0$ indication on vertical scale 25.

A plurality of additional pins 19 then are inserted into permeable foam material 23 by means of pin guiding device 16 and depressor 27. Each pin is inserted at an $x$, $y$ coordinate corresponding to $x$ and $y$ coordinates for which a magnetic field strength measurement is available. Each pin 19 is inserted into material 23 such that the height of the head 18 thereof with respect to the surface of material 23, as determined by vertical scale 25 and marker 28, is representative of the corresponding measured value of magnetic field strength.

Pins 19 may be inserted in any desired sequence. However, it has been found to be convenient to insert all pins along a given $y$ coordinate value in sequence, then proceeding to the next $y$ coordinate value. As this is done, scale clip 26 need not be moved as the plot proceeds from one $y$ coordinate value to the next, supporting base 21 being re-positioned with respect to pin guiding device 16 as each pin is inserted. An alternate method of setting the pin is to insert them in plan at an arbitrary height and thereafter place the scale 25 adjacent so that they can be moved up or down to the desired height.

Additional support devices 29 may also be provided for vertical scale 25, support devices 29 being adapted to fit over the edge of metal box 22 of supporting base 21. When all pins of the display are inserted into permeable material 23 and the vertical scale 25 is not in use, the scale is inserted into support devices 29. For "reading" the value of magnetic field strength at any point in the display, the scale is rested on the edges of the base 21 adjacent the pins in question. A positioning tab 30, arranged to engage the edge of metal box 22, may also be provided as an aid in moving supporting base 21 over the surface of plotting table 11.

Figure 3:
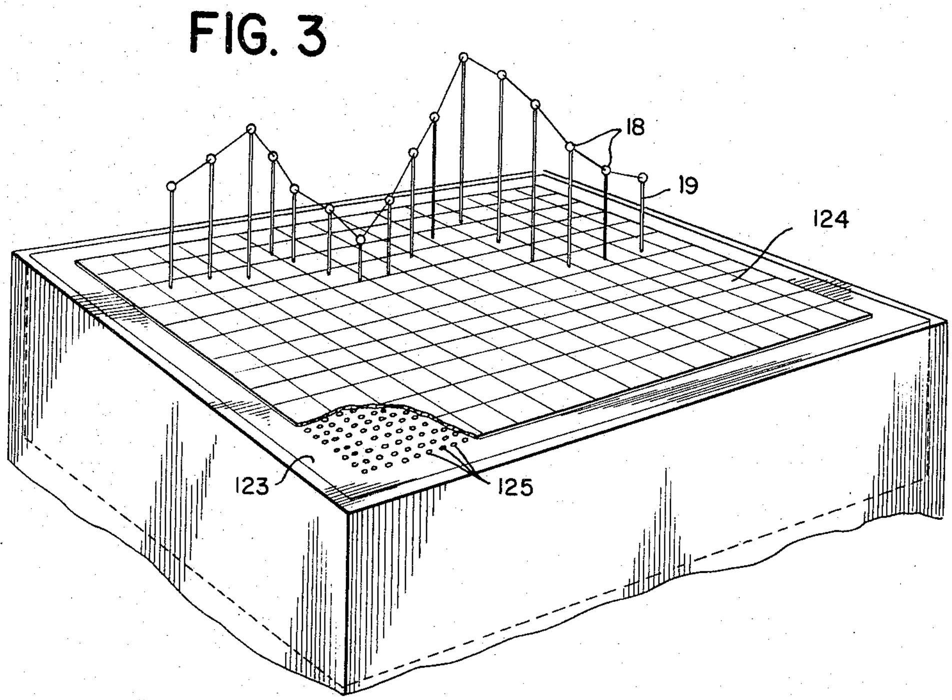
FIGURE 3 is an isometric view of an alternative type of supporting base and further indicates the manner in which a wire or thread may be connected to a number of indicating pins to enhance the display.

In the apparatus shown in FIGURE 3, an alternative form of display supporting base is shown. A permeable material 123, into which pins 19 may be inserted, comprises a honeycomb structure which may be covered, for example, with a thin layer of permeable, rubber-like material 124.

Honeycomb material 123 is rendered permeable by forming therein a regular array of apertures 125 of diameter substantially equal to the diameter of pins 19. Apertures 125 are arranged to guide pins 19 and maintain such pins substantially upright with respect to the top surface of honeycomb material 123. Rubber-like material 124 serves to increase grip on pins 19 and help maintain such pins at the depth to which they are inserted in honeycomb material 123.

Figure 4:
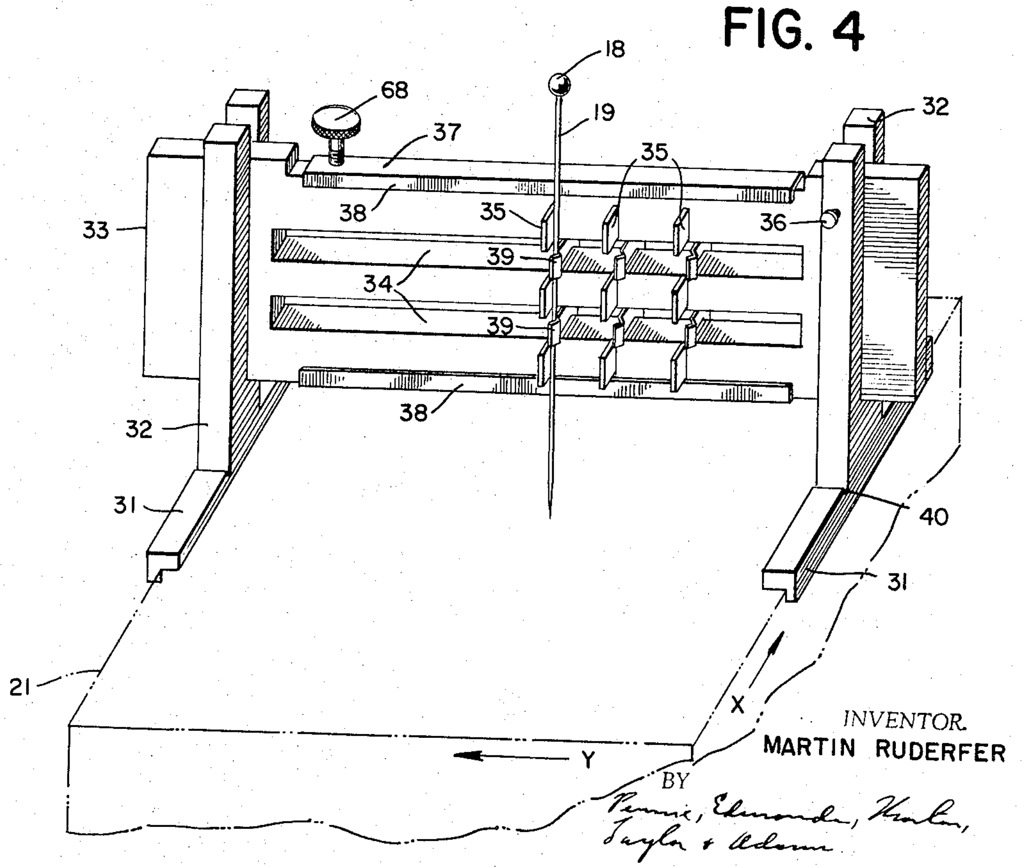
FIGURE 4 is a schematic diagram of an alternative type of pin guiding and positioning device.

In FIGURE 4, an alternative form of pin guiding device is shown, the pin guiding device being adapted for insertion of one or more pins in a row.

The pin guiding device of FIGURE 4 comprises a pair of right angle beams 31 adapted to ride along the edge of a display supporting base 21 of the type shown in FIGURES 1 and 2. A substantially vertical, U-shaped post 32 is attached to each beam 31. A slotted slide 33 of sufficient length to span supporting base 21 is supported by U-shaped posts 32. A pair of slots 34 extend across slide 33 between posts 32. A plurality of sets of flanges 35 extend outwardly from the portions of slide 33 which surround slots 34. Each flange 35 of a set is aligned vertically with all other flanges of the set. A clamping screw 36 is provided to lock slide 33 in position with respect to posts 32. A substantially U-shaped pin locking slide 37 substantially covers one face of slide 33 (the rear face as shown in FIGURE 4) and includes lip portions 38 which overlap a portion of the front face of slide 33 along the top and bottom edges thereof. Pin locking slide 37 is movable over a limited range (between posts 32) with respect to slide 33. A locking screw 68 is also provided to restrain slide 37 from moving with respect to slide 33. A plurality of sets of vertically aligned fingers 39 are attached to slide 37 and extend through slots 34 in the immediate vicinity of flanges 35. Fingers 39 may be integral with slide 37 and include, near the free end thereof, a U-shaped groove adapted to receive a pin 19 as shown in FIGURE 4.

Pins 19 may be inserted into supporting base 21 in the following manner. The entire guiding device shown in FIGURE 4 is positioned along a first $x$ coordinate. Slide 37 is moved to the right (as shown in FIGURE 4) and one or more pins 19 are inserted between grooved fingers 39 and flanges 35 with the points of pins 19 resting lightly on the top surface of supporting base 21. Slide 37 is then shifted to the left to hold pins 19 firmly against flanges 35 and locking screw 68 is tightened. Slide 33 is then positioned so that pins 19 are immediately above a desired $y$ coordinate. Each pin 19 is depressed to an arbitrary height into place at the desired point. After all pins have been so positioned along a given $x$ coordinate line, screw 68 is loosened, slide 37 is moved again to the right, releasing pins 19, and the entire pin guiding device may be moved to the next $x$ coordinate line without disturbing the already inserted pins 19. The pin guiding device of FIGURE 4 thus provides a relatively simple means for insuring insertion of pins into support base 21 along lines which are substantially perpendicular to the top surface of support base 21. The vertical scale 25 is then placed adjacent the pins so that they can be adjusted upwardly or downwardly corresponding to the appropriate value of, for example, magnetic field intensity indicated on vertical scale 25.

Figures 5, 6, 7, 8:
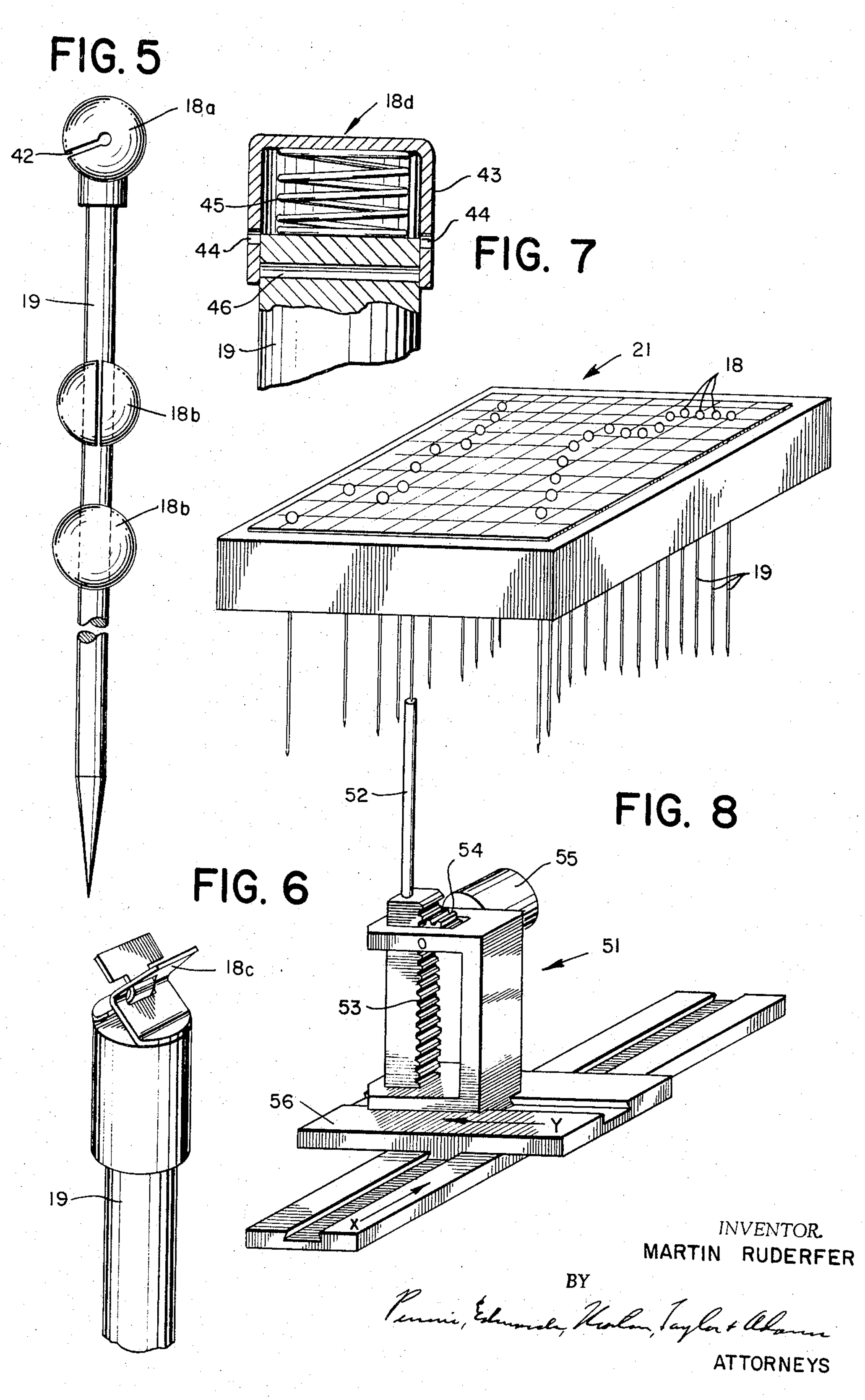
FIGURES 5, 6 and 7 illustrate a variety of heads which may be attached to the pins for special types of displays.
FIGURE 8 is a schematic representation of a third type of pin guiding and positioning means.

FIGURES 5, 6 and 7 illustrate several different types of heads which may be used on pins 19. In FIGURE 5, a substantially spherical head 18*a* is shown attached to one end of pin 19. A slot 42 is cut in head 18*a* to accommodate a string or wire in the manner shown in the display of FIGURE 3. It is to be understood that the heads of the pins may be of various colors, sizes and shapes.

Additional spherical indicating devices 18*b* may also be placed on a single pin 19 as shown in FIGURE 5. Preferably, each such additional device 18*b* resiliently engages pin 19 and may be positioned at any point along pin 19. Several different colored devices 18*b* may be placed on a single pin.

In FIGURE 6, a clip 18c is positioned at one end of pin 19. Such a device facilitates the mounting of physical objects on the pin, for example, for construction a three-dimensional model of an architectural design or for constructing a model of a package of electronic components.

In FIGURE 7, a head 18d is shown wherein a cylindrical sleeve 43 having diametrically opposed holes 44 fits over the end of a pin 19. A spring 45 fastened to pin 19 and to the inside of sleeve 43 normally holds sleeve 43 at a position such that holes 44 are out of alignment with a hole 46 extending through pin 19. When sleeve 43 is depressed, holes 44 and 46 are aligned and permit insertion therethrough of a rod or wire to which a physical object may be attached. The device shown in FIGURE 7 may therefore be used for the same purposes as the device shown in FIGURE 6 and moreover, the former is adapted for use with a pin guide device of the type shown in FIGURES 1 and 2.

When a large number of pins are to be inserted to produce a single display, it is tedious and time consuming to insert the pins manually. Occasions also arise where it may be desirable to plot directly information generated by a computer without the necessity of human intervention. The present invention readily may be adapted for use in conjunction with a computer of other information generating device by adding to the apparatus described above an automatic positioning device similar to the type commonly used for machine tool control.

Figure 9:
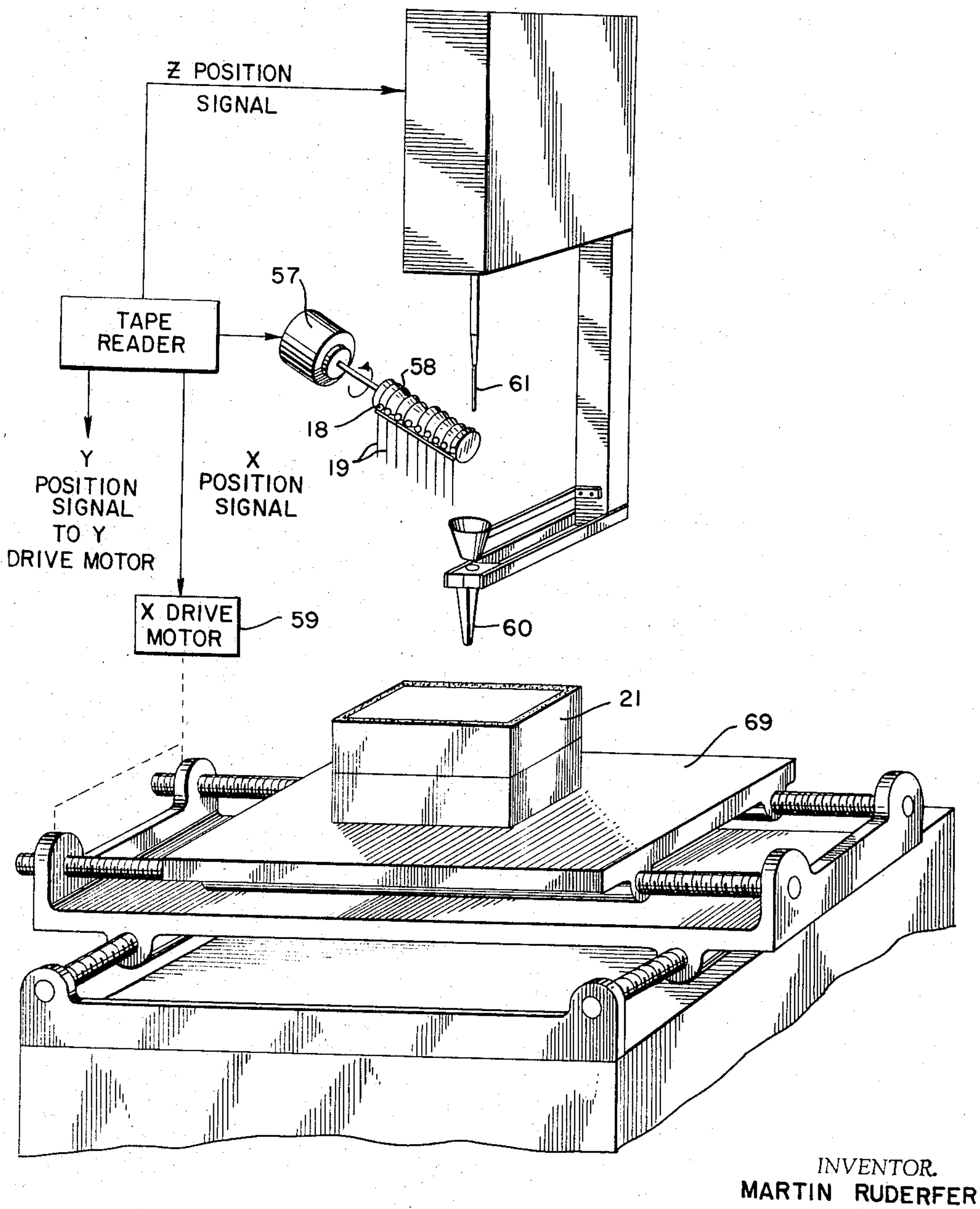
FIGURE 9 is a schematic representation of an automatic apparatus for producing a three-dimensional display in accordance with the invention.

Two types of such automatic positioning apparatus are shown in schematic form in FIGURES 8 and 9.

In the apparatus shown in FIGURE 8, a display supporting base 21 of the type shown in FIGURES 1 and 2 may be used or a base of the type shown in FIGURE 3 may be used. In the former case, an entire array of pins 19 may be inserted into supporting base 21 such that the ends thereof project below the base and selected ones of the pins 19 are then raised by means of a pin guiding device 51 according to the data which is to be displayed. If the apertured honeycomb structure of FIGURE 3 is used instead of the display supporting base 21, pins 19 may be inserted in selected ones of the apertures according to the data which is to be displayed (see FIGURE 8).

In FIGURE 8, the pin guiding and positioning device is indicated generally by the reference numeral 51. Guiding and positioning device 51 is disposed below the display supporting base and comprises a rod 52 mounted on a lifting device such as a rack 53. A pinion 54 driven by a motor 55 moves rack 53 and rod 52 either upwardly or downwardly according to the excitation applied to motor 55. Rod 52, rack 53, pinion 54 and motor 55 are mounted on a slide carriage indicated generally by the reference numeral 56. Carriage 56 is arranged such that rod 52 may be moved along either or both of two mutually perpendicular axes (e.g. $x$ and $y$ axes) by a drive mechanism (not shown) of the type illustrated in connection with rod 52. The details of drive mechanisms and control devices for automatic positioning of the rod 52 are well known in the art of numerical control of machines and therefore will not be described. Suitable open loop and closed loop positioning systems, either of which may be used in the present case, are described in chapter 6 of "Handbook of Automation, Computation and Control—volume 3," edited by Eugene M. Grabbe, Simon Ramo and Dean E. Woolridge, published by John Wiley and Sons, Inc., New York. A further typical positioning system of this type is described at page 9–32 of "Control Engineer's Handbook" edited by John G. Truxal and published by McGraw-Hill Book Company, Inc., New York, N.Y.

The apparatus of FIGURE 8 may be used to produce, automatically, a three-dimensional display of data in the following manner. The data to be displayed may be represented, for example, by coded holes punched in tape and the horizontal and vertical positioning mechanisms associated with rod 52 are actuated according to such coded hole information. Typically, rod 52 is positioned below each pin 19 in turn and rack 53, pinion 54 and motor 55 are operated according to the holes punched in the tape to push the pin upwardly to a height representative of the data to be displayed. The rod 52 is then retracted and the carriage 56 moves rod 52 to a position beneath the next pin 19. Each pin 19 is thus elevated until the entire display is completed.

In FIGURE 9, automatic positioning and insertion apparatus is shown wherein a single turn motor 57 is coupled to a pin dispensing device such as a worm 58. A display supporting base 31 is fixed at a reference position on a movable positioning table 69. A horiontal coordinate positioning system comprising an $x$ drive motor 59, a $y$ drive motor (not shown) and suitable gearing serves to position supporting base 21 with respect to a pin guiding device 60 similar to pin guiding device 16 of FIGURES 1 and 2. An automatcally actuated pin depressor 61, similar to depressor 27 of FIGURES 1 and 2, is mounted above pin guiding device 60 and is driven by a mechanism (not shown) which may, for example, be of the type shown in FIGURE 8 in connection with rod 52.

In operation, the horizontal positioning apparatus of FIGURE 9 is controlled by means of coded hole information punched in tape. Each time the positioning table 69 comes to rest, single turn motor 57 is actuated and a pin 19 drops into pin guiding device 60. Pin depressor 61, then automatically pushes pin 19 into display supporting base 21 such that pin 19 extends above the surface of base 21 to a height representative of the data to be displayed. Each pin is inserted automatically in the same manner until the entire display is produced.

While the invention has been described in terms of a number of preferred embodiments, various modifications within the scope of the invention may be made. For example, while the displays produced have been described in terms of rectangular coordinates, other three dimensional coordinate systems may also be used in accordance with the invention. Also, where it is stated herein that the display apparatus is for visual presentation of quantitative data, it is to be understood that it can be used for advertising or artistic purposes and other functions as well. Furthermore, various types of permeable materials may be used in connection with display supporting base 21 so long as such other materials are capable of yieldably or frictionally engaging pins inserted therein so as to maintain such pins at the depth to which they are inserted.

I claim:

1. Display apparatus for visual representation of the relationship between variable quantities comprising a support; a plurality of elongated, independently positionable indicators, the indicators being adapted for insertion into the support; first coordinate reference means on the support for defining indicator locations along first and second coordinates; second coordinate reference means for defining indicator locations along a third coordinate; and a guide adjacent the support for positioning the indicators along the third coordinate, said guide comprises at least two members biased to form a passageway perpendicular to said first coordinate reference means for slidably and releasably retaining the indicators, the support and the guide being movable with respect to each other to locate the indicators along the first and second coordinates.

2. Display apparatus according to claim 1 wherein the guide positions the indicators substantially normal to a plane defined by the locations on the first and second coordinates.

3. Display apparatus according to claim 2 wherein an upper surface of the support is the plane defined by the locations on the first and second coordinates.

4. Display apparatus according to claim 2 wherein the support comprises a mass of permeable material the upper surface of the permeable material being substantially planar.

5. Display apparatus according to claim 4 wherein the permeable material frictionally engages and maintains in fixed position each inserted indicator.

6. Display apparatus according to claim 5 wherein the permeable material is a foamed plastic.

7. Display apparatus according to claim 1 wherein said guide means comprises at least three members, each member being aligned substantially perpendicular to said first coordinate reference means and biased to form said passageways.

8. Display apparatus according to claim 1 wherein the indicators comprise pins having heads at one end, the position of the heads defining the locations of the three coordinates.

9. Display apparatus according to claim 1 including means for inserting the indicators into the support in positions corresponding to the values of data to be displayed.

10. Display apparatus according to claim 9 wherein the guide comprises two members biased into face-to-face contact with each other, the interface between the two members defining a vertical passage for slidably and releasably retaining the indicator.

11. Display apparatus according to claim 10 wherein the means for inserting the indicators into the support comprises an elongated depressor adapted to be inserted in the guide channel, the depressor being translated to force the indicator into the support and to spread the guide members thereby releasing the indicator.

12. Display apparatus for visual representation of the relationship between variable quantities comprising a support; a plurality of elongated, independently positionable indicators; the indicators being adapted for insertion into the support; first coordinate reference means on the support for defining indicator locations along first and second coordinates; second coordinate reference means for defining indicator locations along a third coordinate; a guide adjacent the support for positioning the indicators along the third coordinate, said guide comprises at least two members biased to form a passageway perpendicular to said first coordinate reference means for slidably and releasably retaining the indicators, the guide and the support being movable with respect to each other to locate the indicators along the first and second coordinates; first automatic means for positioning the guide with respect to the support and second automatic means for inserting the indicators into the support in positions corresponding to the values of the data to be displayed.

13. Display apparatus according to claim 12 wherein the guide positions the indicators substantially normal to a plane defined by the locations on the first and second coordinates.

14. Display apparatus according to claim 13 wherein an upper surface of the support is the plane defined by the locations on the first and second coordinates.

15. Display apparatus according to claim 13 wherein the support comprises a mass of permeable material the upper surface of the permeable material being substantially planar.

16. Display apparatus according to claim 15 wherein the permeable material frictionally engages and maintains in fixed position each inserted indicator.

17. Display apparatus according to claim 16 wherein the permeable material is a foamed plastic.

18. Display apparatus according to claim 12 wherein the indicators comprise pins having heads at one end, the position of the heads defining the locations of the three coordinates.

19. Display apparatus according to claim 12 including means for inserting the indicators into the support in positions corresponding to the values of data to be displayed.

20. Display apparatus according to claim 19 wherein the guide comprises two members biased into face-to-face contact with each other, the interface between the two members defining a vertical passage for slidably and releasably retaining the indicator.

21. Display apparatus according to claim 20 wherein the means for inserting the indicators into the support comprises an elongated depressor adapted to be inserted in the guide channel, the depressor being translated to force the indicator into the support and to spread the guide members thereby releasing the indicator.

References Cited

UNITED STATES PATENTS

| | | | |
|---|---|---|---|
| 337,905 | 3/1886 | Wheelock | 145—46 |
| 641,283 | 1/1900 | Evans | 35—40 |
| 924,054 | 6/1909 | Gehne | 145—46 X |
| 1,884,369 | 10/1932 | Swanson | 35—41 X |
| 2,386,199 | 10/1945 | Dominick | 35—41 |
| 2,663,527 | 12/1953 | Joslyn | 35—73 UX |
| 3,065,554 | 11/1962 | Colabella | 35—41 |
| 3,068,591 | 12/1962 | Bielinski | 35—41 |

FOREIGN PATENTS 52,574 8/1910 Switzerland.

EUGENE R. CAPOZIO, *Primary Examiner.*

H. S. SKOGQUIST, *Assistant Examiner.*